No. 829,881. PATENTED AUG. 28, 1906.
A. C. MASSEY.
DIVIDED AXLE FOR RAILWAY AND OTHER VEHICLES.
APPLICATION FILED DEC. 26, 1905.
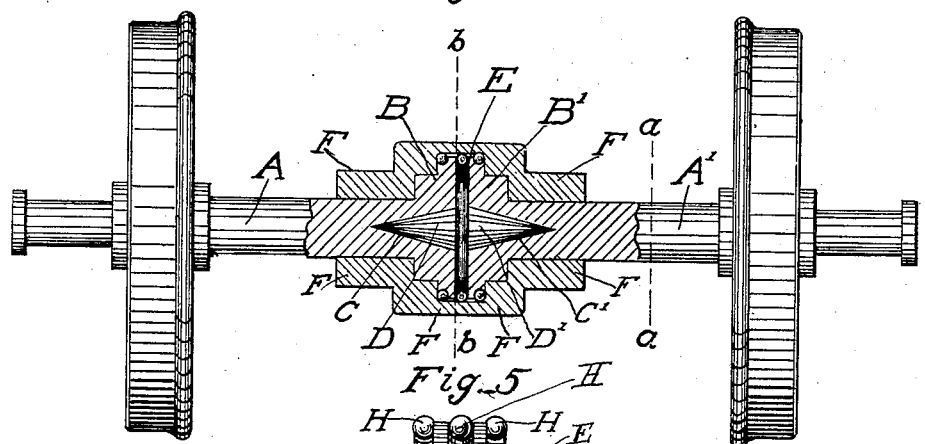
Fig. 1
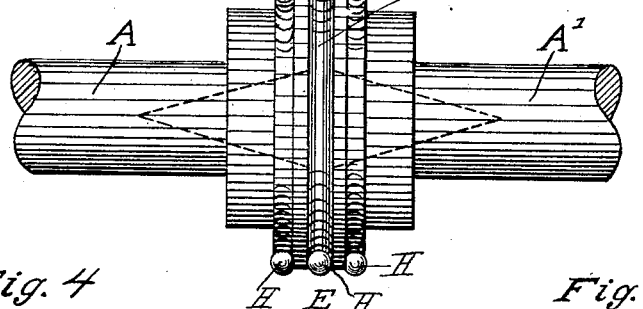
Fig. 5
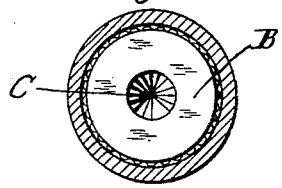
Fig. 4
Fig. 3
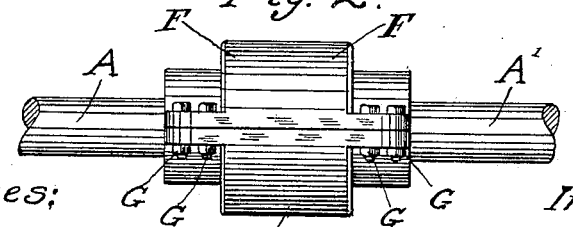
Fig. 2
Witnesses:
Reni Berry
William E. Murray
Inventor:
Augustus Casnor Massey,
By St. John Day,
Attorney.

UNITED STATES PATENT OFFICE.

AUGUSTUS CASNOR MASSEY, OF LOS ANGELES, CALIFORNIA.

DIVIDED AXLE FOR RAILWAY AND OTHER VEHICLES.

No. 829,881.  Specification of Letters Patent.  Patented Aug. 28, 1906.

Application filed December 26, 1905. Serial No. 294,337.

*To all whom it may concern:*

Be it known that I, AUGUSTUS CASNOR MASSEY, of the city of Los Angeles, in the county of Los Angeles and State of California, have invented certain new and useful Improvements in Divided Axles for Railway or other Vehicles, of which the following is a full, clear, and exact description or specification, reference being had to the annexed drawings, and to the letters marked thereon.

The object of my present invention is to render the joints of divided axles for railway-vehicles more sensitive to the varying rates of rotation which the wheels of railway-vehicles are subject to when traveling upon curved portions of railways or when from any other cause the wheels upon the same axle are caused to revolve at different velocities.

My improvements are clearly represented upon the annexed sheet of drawings, of which—

Figure 1 is an elevation, partly in section, of a pair of wheels and a divided railway-car axle constructed in accordance with my present invention. Fig. 2 is an elevation of the central part of the axle, showing the exterior of the yoke containing and holding in operative relationship the several parts constituting the central joint connecting the two halves of the divided axle. Fig. 3 is a transverse section on the line $a\ a$, Fig. 1. Fig. 4 is another transverse section on the line $b\ b$, Fig. 1. Fig. 5 is an enlarged elevation of the inner ends of the divided axle, showing the operative parts connected therewith, but in which figure the yoke containing and inclosing these operative parts is not shown.

In the drawings each half of the axle is marked A and A', respectively. On that half of the axle marked A there is formed the flange B, and on the other half of the axle (marked A') there is formed the other flange B'. The two flanges B and B' are like each other excepting that the corresponding parts are situated in reverse directions, respectively. In the central part of each flange B and B' and projecting downward or inwardly into each half-axle A and A' is a conical recess C and C'. Into each of these recesses C and C' the conical projections D and D', respectively, fit, as shown at Figs. 1 and 5. These conical projections D and D' are fastened to or form part of the disk E, which is of such thickness as to fit into the space between the two flanges B and B' when all the parts of the device are inclosed together in their respective relationships and held together by the yoke F, as shown at Figs. 1, 2, and 3. The yoke F is constructed of two portions which are held together by tightening nuts and bolts G G, as shown at Figs. 2 and 3, and with the object of enabling the operative parts to roll and rotate as required with a minimum of friction. The edge of the disk E, as well as the outer edges of the two flanges B and B', have circularly-segmental grooves formed therein, as shown more particularly at Fig. 5, wherein antifriction-rollers H H H are placed, said rollers being also inclosed by the yoke F.

In assembling the several parts of this device for operative purpose the several parts are oiled or greased in order to allow the same to yield rotatively with a minimum friction on the arising of a torsional strain, and an oiling device of any suitable kind may be applied to the yoke for supplying oil as a lubricant to the interior parts when necessary, or the use of an oleaginous liquid may be dispensed with, and the surfaces of the operative parts may be brushed with black lead, plumbago, or other metallic or partly metallic lubricant.

I would have it understood that my invention includes such changes and modifications in the shape of the device and its parts as may fall within the terms and scope of the following claims.

Having now described the nature of my said invention and the best system, mode, or manner I am at present acquainted with for carrying the same into practical effect, I desire to observe in conclusion that what I consider to be novel and original, and therefore claim as the invention to be secured to me by Letters Patent, is as follows:

1. The joint for divided axles carrying wheels of railway-vehicles, consisting of each half-axle at its inner end being provided with a flange, a groove for receiving part of the antifriction-rollers, and a conical recess for receiving one of the conical projections forming part of or attached to the central disk of the device, the said central disk of the device, also being formed at its edge, hollow, to receive and hold some of the antifriction-rollers, each half of the divided axle being of such length as to have between the adjacent faces of the flanges a space sufficient to contain the disk carrying the two conical projections, the yoke for containing and confining all the parts in operative relationship, in the manner and for the purposes substantially as hereinbefore described.

2. The joint for divided axles wherein when the parts are in operative relationship, the flanges at the inner ends of each half-axle are maintained at a distance apart by the disk and its two cones, being situated between the flanges, one on each inner end of the half-axle, and the cones within the conical recesses at the center of each half-axle, said operative parts being confined within the yoke which also incloses the three sets of antifriction-rollers, the whole operating together substantially as set forth.

In testimony whereof I, the said AUGUSTUS CASNOR MASSEY, have hereunto set my hand and seal, at Los Angeles, aforesaid, in the presence of two subscribing witnesses.

AUGUSTUS CASNOR MASSEY. [L. S.]

Witnesses:
ST. JOHN DAY,
ALLEN A. IRISH.